J. A. PERKINS.
THRUST BEARING.
APPLICATION FILED MAY 6, 1913.

1,218,312.

Patented Mar. 6, 1917.
2 SHEETS—SHEET 2.

Witnesses:
A. R. Appleman
H. C. Steuber

Inventor
Julius A. Perkins
By Attorney
J. Chris Larsen

UNITED STATES PATENT OFFICE.

JULIUS A. PERKINS, OF NEW YORK, N. Y.

THRUST-BEARING.

1,218,312.　　　　　　　　Specification of Letters Patent.　　　Patented Mar. 6, 1917.

Application filed May 6, 1913.　Serial No. 765,784.

*To all whom it may concern:*

Be it known that I, JULIUS A. PERKINS, a citizen of the United States of America, and residing at New York, in the county of New York and State of New York, have invented certain new and useful Improvements in Thrust-Bearings, of which the following is a specification, such as will enable those skilled in the art to which it appertains to make and use the same.

This invention relates to anti-frictional thrust bearings adapted for use in heavy machinery and, at times, within limited spaces, and one of the objects of the invention is to provide certain elements which compensate for structural or other inequalities due to the impossibility of producing perfectly accurate workmanship commercially for such uses.

The present showing is in connection with a vertical shaft supported by a series of conical rollers mounted in a suitable cage and operating between upper and lower bearing members, said rollers and bearing members frequently presenting imperfections which tend to place undue strains upon the shaft and connections in the rotation of the former and, in order to obviate injury to any of the parts by such imperfections, I provide an intermediate element which is the functional equivalent of universal joints, gimbal rings, and ball and socket joints, but being of much less cost than either, stronger than the first two named, which avoids the great friction in the last named, and which does not require a high degree of accuracy in manufacture.

When conical rollers are employed it has been found that each does not carry its share of the load because of inaccurate adjustment, another object of my invention being to provide simple adjusting means therefor, in the radial line of the cage and also to provide means in connection with the rollers for minimizing any abnormal roller operation because of faults therein or in the bearing members and which means also serve as flexible backings for the centrifugal action on the rollers.

Another feature which I present is that of making one of the bearing members with its bearing surface in a plane at right angles to the axis of the shaft which does not require as accurate workmanship as the inclined surfaced members and accurate workmanship is more easily attained on plane surfaces than on inclined surfaces and is, therefore, much less costly in manufacture without any functional sacrifice; I also illustrate and later describe a simplified roller cage construction whereby the cost of manufacture is reduced and the assembling of the rollers therein expedited, with a consequent saving in labor, and I also show simple but efficient lubrication means for the bearings.

My invention is fully described in the following specification, of which the accompanying drawings form a part, in which the same reference characters are used to designate the same parts in each of the views, and in which:—

Figure 1:
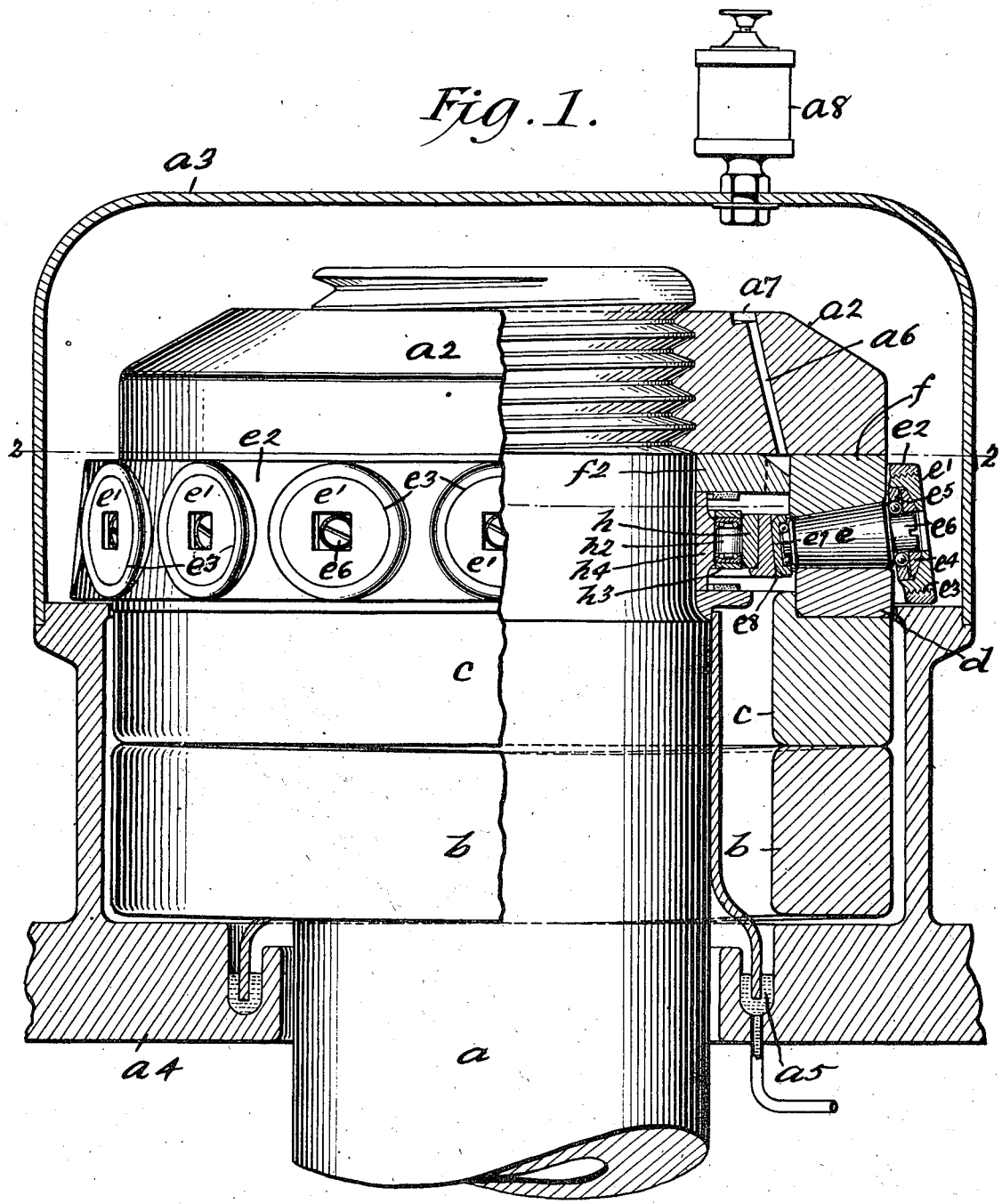
Figure 1 is a side elevation of one form of embodiment of my invention, partly in section.
Figure 2:
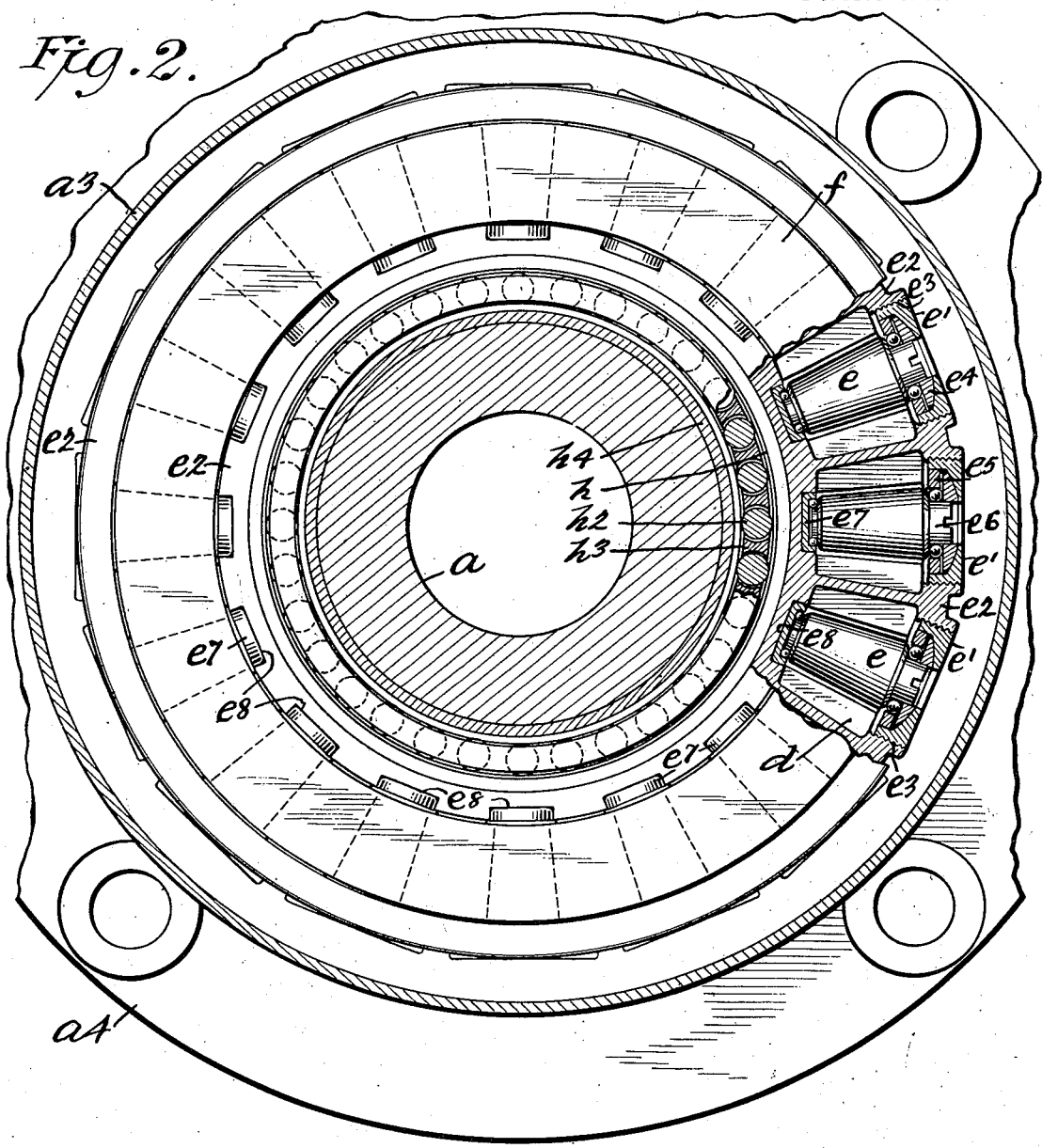
Fig. 2 is a section taken approximately on the line 2—2 of Fig. 1.
Figure 3:
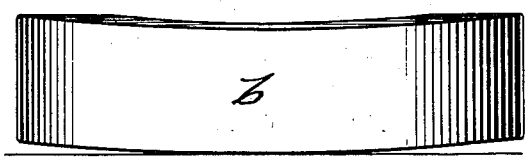
Figs. 3 and 4 are views, at right angles to each other, of an equalizing element which I employ.
Figure 4:
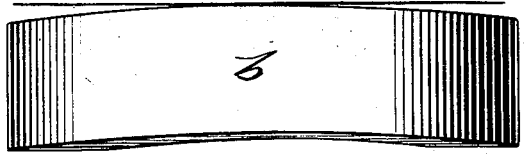

In the drawings forming a part of this application I have shown a shaft $a$ screw threaded at its upper end for a nut $a^2$ and mounted in a housing $a^3$ having a base $a^4$ through which the shaft projects, an oil seal $a^5$ being shown as a moisture and dust guard between the shaft and base.

Arranged upon the base is a ring $b$ which has its upper and lower faces outwardly curved at quadrant points, another ring $c$ having plane faces resting on the ring $b$, and it will be noted that the ring $b$ may rock in one direction, backwardly and forwardly, on the base whereas the ring $c$ may rock upon the ring $b$ but in a direction at right angles to the rocking ability of the ring $b$, thus producing a universal joint between the base and ring $c$, to a slight but sufficient degree of movement, this being determined by the degree of curvature of the faces of the ring $b$.

Seated upon the ring $c$ is a bearing member $d$ with the bearing surface thereof in a plane at right angles to the axis of the shaft, a plurality of conical rollers $e$ moving thereover and being carried by a cage $e^2$, and a bearing member $f$ having a bearing surface inclined in the degree of inclination of the rollers resting on the latter, between the same and the nut $a^2$, and I also provide a positioning ring $f^2$ on the shaft for the member $f$, said ring $f^2$ being preferably channeled on its upper surface and vertically bored to permit the entrance of lubricants to the parts thereunder, a bore $a^6$ in the nut $a^2$, or series of bores if desired, directing such lubricants from a concentric channel $a^7$ to the space beneath the nut, and I also provide a regulated oil-cup $a^8$ on the housing $a^3$ directly above the channel $a^7$, the lubricants dropping to the parts beneath the lubricating means when the shaft is not rotating and being sprayed over the parts by centrifugal action when the shaft is rotating.

The cage $e^2$ is provided with a plurality of large bores $e^3$ in its periphery, one for each roller, and screw threaded internally to engage caps $e^1$ screwed thereinto by means of a spanner or socket wrench, and being internally concaved to provide a seat for a rocking plate $e^4$ which in turn serves as a bearing for a series of balls interposed between the same and the corresponding roller end, a ball confining raceway ring $e^5$ being also employed, such bearing elements being hardened whereas the cage and caps are soft metal, and the rollers are each provided with an end pintle $e^6$ having a slot in the end thereof for a reason later set forth.

The inner roller ends are also provided with pintles and shoulders and about each of which pintles is a series of balls operating in corresponding caps $e^7$ resting in slots, the center line of each of which is in the plane of the axis of the corresponding conical roller and the axis of the shaft, as shown at $e^8$, this being for ease of roller assembling and for economy of cage construction for the reason that said slots may be cast in the cage or may be machined therein from either surface of the cage whereas, in another form, the recesses for the caps $e^7$ would have to be produced and finished from the cage periphery, through the bores $e^3$, a much more difficult proceeding.

Within the cage is a bearing ring $h$ for a series of rollers $h^2$ carried by a cage $h^3$ and which rollers impinge upon a bearing member $h^4$ on the shaft $a$, this series of rollers serving to maintain the relationship between the shaft and the cage $e^2$ in an anti-frictional manner, suitable confining flanges being provided on the shaft for the roller cage $h^3$ as well as cage controllers of fiber or the like, floating freely.

From the above it will be seen that a thrust bearing is provided in which considerable lateral shaft movement is permitted when required because of any abnormal operation due to imperfections or inequalities, structural or otherwise, thus obviating sudden strains on the shaft or bearings which might tend to injure the parts, this being accomplished in a very economical manner, a constant relationship between shaft and bearings is maintained because of the supplemental cage of rollers, and adjustability of the bearing rollers is permitted to insure each conical roller having its share of the load, and I also lessen the cost of the bearing by eliminating one of the relatively costly inclined bearing members and substituting therefor a plane surfaced ring of easy manufacture without interfering with the proper operation of the rollers.

In assembling the bearing the rollers are arranged in the cage, upon the lower bearing member, and the upper member placed in position, after which the rollers are adjusted by moving the corresponding adjusting cap inwardly or outwardly, an ordinary screw driver being used in the slotted pintle of each roller to test the same and see if it rotates too freely or not sufficiently so for an equal distribution of the load over all of the rollers and, if not, the corresponding adjusting cap is moved correspondingly, all of the rollers being so tested without the necessity for taking the bearing apart, this being of great importance in bearings adapted for heavy loads, and will also be noted that a lateral flexibility of each roller is rendered possible because of the ball and socket arrangement at the outer ends of the rollers, this constituting a flexible backing for the anti-friction means for taking the centrifugal thrust of the rollers.

My bearing is very simple in construction, inexpensive in initial cost and in maintenance, and highly efficient, and is particularly adapted for limited bearing spaces and, with a reservation to myself of all such changes in and modifications of the details shown and described as properly come within the scope of the following claims, what I do claim as new, and desire to secure by Letters Patent, is:—

1. A bearing, comprising a support, a bearing member thereon, a shaft, a bearing member thereon, rollers interposed between said members, and a ring interposed between said support and the bearing member carried thereby, each face of which is provided with two diametrically opposed convex portions, the convex portions of one face being at right angles to those on the other face, whereby said ring may rock on said support and the bearing member may rock on said ring, said ring presenting upper and lower contact lines extending to the outer edge of said ring.

2. As an article of manufacture, for use in a bearing, a ring each face of which is provided with two diametrically opposed convex portions, the convex portions on one face being at right angles to those on the other face, whereby the direction of rock on one face is perpendicular to the direction of rock on the opposite face.

In testimony that I claim the foregoing as my invention I have signed my name, in presence of the subscribing witnesses, this 5th day of May, 1913.

JULIUS A. PERKINS.

Witnesses:
WILLIAM A. BOECKEL,
J. C. LARSEN.